United States Patent
Peterson et al.

(10) Patent No.: US 12,457,260 B2
(45) Date of Patent: Oct. 28, 2025

(54) METHODS AND DEVICES FOR MONITORING QUALITY OF WIRELESS CONTENT

(71) Applicant: LENOVO (SINGAPORE) PTE. LTD, New Tech Park (SG)

(72) Inventors: Nathan Peterson, Oxford, NC (US); Russell Speight VanBlon, Raleigh, NC (US); Arnold Weksler, Raleigh, NC (US); Mark Delaney, Raleigh, NC (US); John C. Mese, Cary, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 248 days.

(21) Appl. No.: 17/528,266

(22) Filed: Nov. 17, 2021

(65) Prior Publication Data
US 2023/0156067 A1    May 18, 2023

(51) Int. Cl.
*H04L 65/80* (2022.01)
*H04L 65/60* (2022.01)

(52) U.S. Cl.
CPC .............. *H04L 65/80* (2013.01); *H04L 65/60* (2013.01)

(58) Field of Classification Search
CPC ................................ H04L 65/80; H04L 65/60
See application file for complete search history.

(56) References Cited

U.S. PATENT DOCUMENTS

| 11,122,408 | B1* | 9/2021 | Mravca | H04W 4/80 |
| 2020/0105291 | A1* | 4/2020 | Sheaffer | H04R 3/005 |
| 2021/0405865 | A1* | 12/2021 | Faulkner | H04N 7/147 |

* cited by examiner

*Primary Examiner* — Suraj M Joshi
(74) *Attorney, Agent, or Firm* — Dean D. Small; The Small Patent Law Group, LLC

(57) ABSTRACT

A computer implemented method, device, and computer program product are provided for monitoring audio/video (A/V) content. During an A/V communications session between a user and a recipient, the method, device and computer program product receive, from a wireless source, A/V content for the user. The A/V content has a baseline quality for at least a portion of the AV communications session. A quality characteristic of interest (COI) associated with the A/V content is monitored. Event-induced signal (EIS) degradation is identified when the quality COI drops below the baseline quality at least one of i) by a predetermined amount or ii) within an event interval. In real-time during the AV communications session, a notification is generated. The notification indicates that the quality COI for the A/V content has degraded.

19 Claims, 4 Drawing Sheets

METHODS AND DEVICES FOR MONITORING QUALITY OF WIRELESS CONTENT

BACKGROUND

Embodiments of the present disclosure generally relate to methods and devices that provide wireless audio and/or video communications and more particularly to monitoring a quality of the wireless audio and/or video content in real-time.

Today, people are increasingly relying upon software-based technologies for remote audio/video (AV) conferencing and general communication, such as in connection with business, academic and personal communications between individuals at various locations around the world. Electronic devices (e.g., cellular phones, tablet devices, laptop computers) and computer systems utilized numerous types of software communication platforms to provide audio/video conferencing. A wide variety of wireless AV input devices are offered for collecting audio and/or video content from users, such as wireless headsets, wireless microphones, wireless earbuds, wireless cameras, as well as the microphones and cameras in wireless intelligent televisions, tablet devices, personal digital assistant devices, desktop and laptop computers, smartphones, smart watches, intelligent speakers, intelligent home theater systems, set-top boxes, digital media player consoles, gaming consoles, and the like.

However, a problem with wireless AV input devices is that a quality of the presentation of audio and/or video content may degrade without the source user knowing that a problem exits. The source user may continue to talk and/or present video content, not realizing that the destination viewers are having difficulty hearing or seeing (or simply cannot hear or see) the content. The source user may continue talking/presenting until someone else on the call/conference informs the source user of the poor quality. For example, when a source user is talking on a call while the signal is being affected, typically the user talking doesn't know there's an issue until other attendees ask them to repeat something.

Once notified of the problem, another problem arises in that the source user usually does not know the cause of the problem. For example, a user with a wireless headset may not know if the audio quality has degraded due to a wireless reception issue, an issue with the internet, etc. If the user is not using the internet, then problem is more likely a reception issue within the local wireless environment of the source user, but the user still will not necessarily know why it is occurring. For example, during a conference call, a specific users audio quality may keep changing from good to bad and vice versa. After extensive trial-and-error testing of various potential causes, the user may determine that the change from good to bad quality coincides with the source user setting an insulated metal cup in front of his/her laptop.

Accordingly, a need remains for methods, devices, and computer program products that monitor quality of wireless audio and/or video content and that overcome the foregoing and other disadvantages of conventional approaches.

SUMMARY

In accordance with embodiments herein, a computer implemented method a computer implemented method is provided for monitoring audio/video (A/V) content, the method comprising: under control of one or more processors configured with specific executable program instructions, during an A/V communications session between a user and a recipient: receiving, from a wireless source, A/V content for the user, the A/V content having a baseline quality for at least a portion of the AV communications session; monitoring a quality characteristic of interest (COI) associated with the A/V content; identifying an event-induced signal (EIS) change when the quality COI crosses the baseline quality at least one of i) by a predetermined amount or ii) within an event interval; and generating, in real-time during the AV communications session, a notification indicating that the quality COI for the A/V content has changed.

Additionally, or alternatively, the method further comprises the method further comprising: providing, at a user interface, an indication regarding the quality COI; and intermittently or continuously updating the indication with a current quality COI in real-time with receipt of the AV content. Additionally or alternatively, the EIS change represents EIS degradation that relates to an event occurring in a proximity to the wireless source while the user is talking and the notification being generated in real-time with the event. Additionally or alternatively, the wireless source is a wireless microphone, the AV content is audio content from the wireless microphone, the EIS change represents EIS degradation related to an event occurring in a proximity to the microphone while the user is talking and the notification being generated in real-time with the event. Additionally or alternatively, the quality COI includes at least one of signal strength, signal to noise ratio, data rate, dropped data packets, retransmitted data packets, blurred image frames, omitted image frames, blurred audio, or omitted audio. Additionally or alternatively, the notification includes at least one of an audible cue, a visual cue, a pop-up message, the notification indicating that the quality COI for the A/V content has degraded or improved. Additionally or alternatively, the notification includes an indication of at least one of a potential source for the EIS change or a suggested corrective action to take to potentially correct EIS degradation. Additionally or alternatively, the EIS change represents EIS degradation that is identified when the quality COI drops below the baseline quality, the method further comprising, in response to the identification of the EIS degradation, continuing to monitor the quality COI associated with the AV content, and identifying an EIS improvement when the quality COI has increased to exceed the baseline quality or a corrective baseline.

In accordance with embodiments herein, a device is provided that comprises: one or more processors; and memory storing program instructions accessible by the one or more processors, wherein, responsive to execution of the program instructions, during an A/V communications session between a user and a recipient, the one or more processors: receive, from a wireless source, A/V content for the user, the A/V content having a baseline quality for at least a portion of the AV communications session; monitor a quality characteristic of interest (COI) associated with the A/V content; identify an event-induced signal (EIS) change when the quality COI crosses the baseline quality at least one of i) by a predetermined amount or ii) within an event interval; and generate, in real-time during the AV communications session, a notification indicating that the quality COI for the A/V content has changed.

Additionally, or alternatively, the device further comprises a user interface configured to provide an indication regarding the quality COI; and intermittently or continuously update the indication with a current quality COI in real-time with receipt of the AV content. Additionally, or alternatively, the EIS change represents EIS degradation related to an event occurring in a proximity to the wireless source while the user is talking and the notification being generated in real-time with the event. Additionally, or alternatively, the wireless source is a wireless microphone, the AV content is audio content from the wireless microphone, the EIS change represents EIS degradation related to an event occurring in a proximity to the microphone while the user is talking and the notification being generated in real-time with the event. Additionally, or alternatively, the quality COI includes at least one of signal strength, signal to noise ratio, data rate, dropped data packets, retransmitted data packets, blurred image frames, omitted image frames, blurred audio, or omitted audio. Additionally, or alternatively, the notification includes an indication of at least one of a potential source for EIS degradation or a suggested corrective action to take to potentially correct the EIS degradation. Additionally, or alternatively, the EIS change represents EIS degradation that is identified when the quality COI drops below the baseline quality, and wherein, responsive to execution of the program instructions, the one or more processors are further configured to, in response to the identification of the EIS degradation, continue monitoring the quality COI associated with the AV content, and identify an EIS improvement when the quality COI has increased to exceed the baseline quality or a corrective baseline. Additionally, or alternatively, the device represents one of a headset, microphone, camera, smart phone, desktop computer, laptop computers, tablet device, smart TV, or digital personal assistant (DPA) device, the device comprising at least one of software or firmware to perform the monitoring, identifying and generating operations.

In accordance with embodiments herein, a computer program product is provided that comprises a non-signal computer readable storage medium comprising computer executable code to: during an A/V communications session between a user and a recipient, receive, from a wireless source, A/V content for the user, the A/V content having a baseline quality for at least a portion of the AV communications session; monitor a quality characteristic of interest (COI) associated with the A/V content; identify an event-induced signal (EIS) change when the quality COI crosses the baseline quality at least one of i) by a predetermined amount or ii) within an event interval; and generate, in real-time during the AV communications session, a notification indicating that the quality COI for the A/V content has changed.

Additionally, or alternatively, the EIS change represents EIS degradation, the computer program product further comprising computer executable code to provide the notification as an indication of at least one of a potential source for the EIS degradation or a suggested corrective action to take to potentially correct the EIS degradation. Additionally, or alternatively, the EIS change represents EIS degradation, the computer program product further comprising computer executable code to, in response to the identification of the EIS degradation, continue to monitor the quality COI associated with the AV content, and determine when the quality COI has increase to exceed the baseline quality or a corrective baseline. Additionally, or alternatively, the computer executable code defines the quality COI as at least one of signal strength, signal to noise ratio, data rate, dropped data packets, retransmitted data packets, blurred image frames, omitted image frames, blurred audio, or omitted audio.

DETAILED DESCRIPTION

Figure 1:
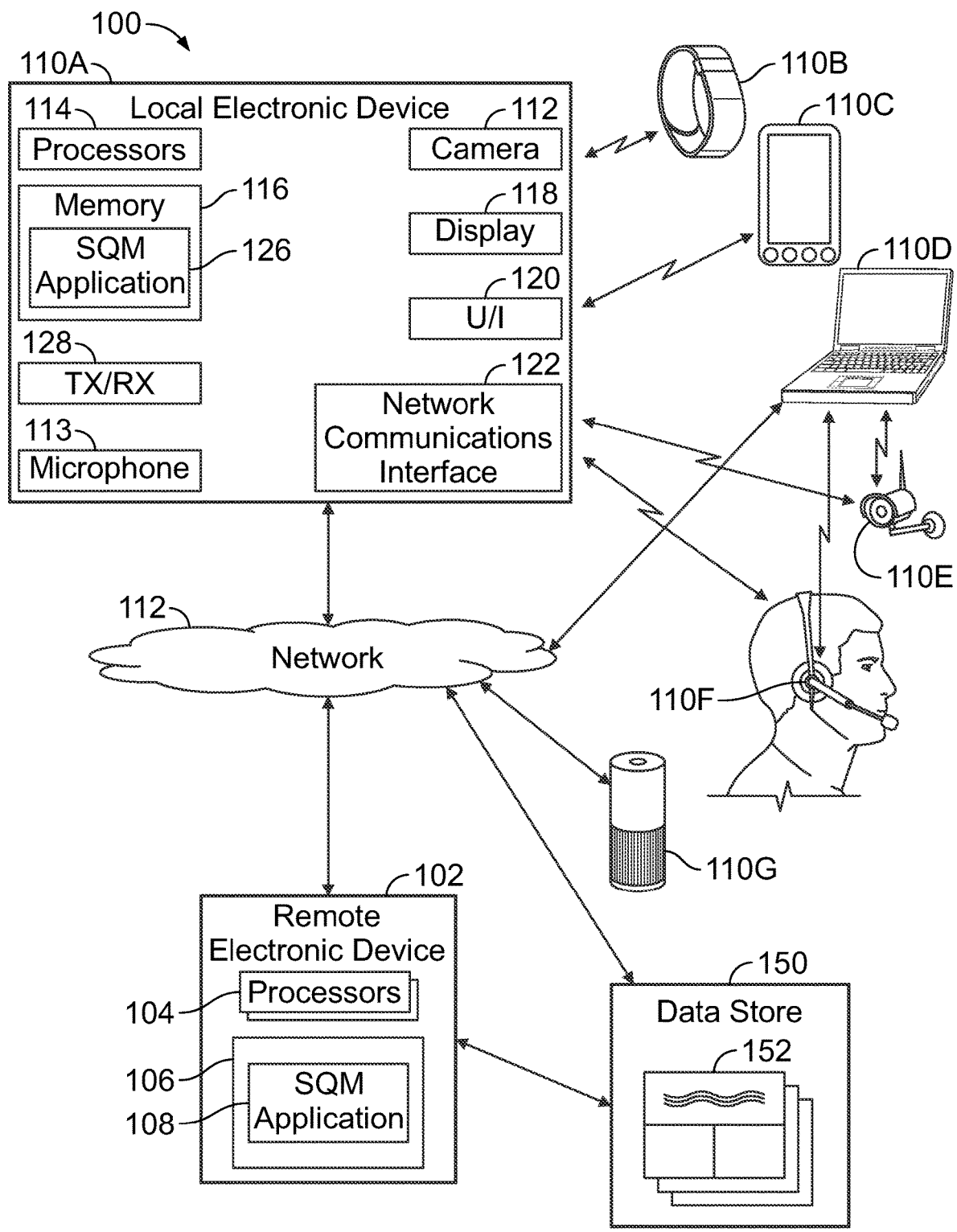
FIG. 1 illustrates a system configured to monitor AV content in real-time during an AV communication session in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Terms

The term "COI" shall mean characteristic of interest.

The term "EIS" shall mean event induced signal.

The term "SQM" shall mean signal quality monitoring.

The term "SNR" shall mean signal to noise ratio.

The terms "AV", "A/V", and "audio/video" shall mean audio and/or video. For example, AV content may include audio content and no video content, or video content and no audio content, or both audio and video content.

The term "event interval" shall mean a short period of time immediately following a corresponding event. For example, an event interval degradation may correspond to a period of time of less than 10 seconds, preferably within 0.5 seconds to 10 seconds, or more preferable 0.5-5 seconds and even more preferably 0.5-3 seconds.

The term "event induced," as used in connection with signal degradation and a quality COI, shall mean an action or change that causes a substantial degradation of the quality COI in the AV content within an event interval. For example, within an event interval, the quality COI may drop by a predetermined amount, such as 40% or more, or preferably 50% or more, or more preferably 60% or more. Optionally, the drop in quality may be measured as an absolute number such as in decibels (dB) (e.g. 10 dB drop in signal strength). As a further example, an EIS degradation may be declared when the SNR drops 50% within a 3 second period of time, or the signal strength drops 40% in a 2 second period of time.

The terms "real time" and "real-time" shall mean at the same time, or a time substantially contemporaneous, with an occurrence of another event or action. For the avoidance of doubt, real-time monitoring of AV content shall mean that a quality COI is monitored and analyzed during an AV communication session and a notification provided during the AV communications session and within a few seconds of the event causing the degradation.

System Overview

In accordance with embodiments herein, methods, systems, devices and computer program products are provided for monitoring the quality of audio/video content conveyed between one or more wireless devices to identify sudden degradation in a recipient perceptible quality in the audio/video content. When a sudden degradation is identified in the perceptible quality, a notification is generated to inform the individual who is the source of the audio/video content of the problem. The process for monitoring quality, and generating notifications is implanted in a manner such that the notification occurs in real-time, substantially contemporaneous with an event that may have induced the degradation. Optionally, the methods, systems, devices and computer program products may further provide the capability to debug the source of the degradation. For example, a user interface may present one or more audio/video elements to user that continuously show indicia indicative of the AV signal, such as to allow a user to try to reverse an event induced degradation and return the AV signal to a normal/baseline quality level.

By way of example, quality monitoring and notification software and/or firmware may be implemented in various electronic devices that are utilized to maintain an AV communication session. For example, when a user utilizes a wireless headset and/or camera to capture AV content during an AV conference, the local electronic device (e.g., a smart phone, tablet device, laptop computer, desktop computer) that receives the wireless AV content from the headset and/or camera may implement monitoring the notification, software and/or firmware configured to operate as described herein. Additionally or alternatively, the monitoring and notification software and/or firmware may be implemented, further downstream, from the source of the wireless AV content. For example, the monitoring and notification software and/or firmware may be implemented at a local wireless router, hub, server or other electronic device provided within the channel of the communication session, before the AV content is passed to a remote network (e.g. the Internet, a wide-area network, etc.).

FIG. 1 illustrates a system 100 configured to monitor AV content in real-time during an AV communication session in accordance with embodiments herein. The system 100 may include a single electronic device that implements all of the operations and structures described herein. Additionally, or alternatively, the system 100 may include multiple electronic devices that share in the operations and structures described herein. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like. For example, the system 100 may utilize one or more of the illustrated electronic devices 110A-110G (also referred to collectively as 110) to collect AV content individually or in combination with one another, monitor one or more quality COI of the AV content, identify the event induced signal degradation and generate, in real time during the AV communication session, one or more notifications indicating that the quality COI of the AV content has degraded below an acceptable level.

The electronic devices 110A-110G may communicate directly with one another over one or more local wireless links, utilizing various wireless protocols, such as Bluetooth, (e.g., using a Bluetooth protocol, ZigBee, Z-Wave and the like. For example, the wireless headset 110F and the wireless camera 110E may communicate wirelessly with laptop computer 110D. Additionally or alternatively, a smart watch 110B and/or smart phone 110C may communicate wirelessly with another local electronic device 110A, such as a tablet device, laptop computer and the like.

The electronic devices 110 may communicate through a wholly or partially wired or wireless network 112. In accordance with embodiments herein, one or more of the electronic devices 110 are utilized to establish an AV communication session over the network 112 with a remote electronic device 102. The electronic device 102 may include all or portions of the structures and functions described above in connection with the electronic devices 110. To simplify the illustration, not all of the structures and functions within the electronic device 102 are illustrated. The network 112 may represent the World Wide Web, a local area network, a wide area network and the like.

The electronic device 110 includes one or more processors 114, memory 116, a display 118, a user interface 120, a network communications interface 122, and various other mechanical components, electrical circuits, hardware and software to support operation of the client device 110. It is recognized that not all electronic devices 110 include a display, user interface, and the like. For example, a fixed or handheld camera may simply include camera related electronics and network circuitry to support communication to and from the camera. While shown will multiple features, optionally, the local electronic device 110A may omit the user interface 120, camera 112, a display 118, microphone 113, and instead simply represent a local wireless router, network access point and the like that receives AV content wirelessly from a camera 110E and/or a wireless headset 110F.

The user interface 120 may include a variety of visual, audio, and/or mechanical devices. For example, the user interface 120 can include a visual input device such as an optical sensor or camera, an audio input device such as a microphone, and a mechanical input device such as a keyboard, keypad, selection hard and/or soft buttons, switch, touchpad, touch screen, icons on a touch screen, touch sensitive areas on a touch sensitive screen and/or any combination thereof. Similarly, the user interface 120 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the user interface 120 may include a touch sensitive screen, a non-touch sensitive screen, a text-only display, a smart phone display, an audio output (e.g., a speaker or headphone jack), and/or any combination thereof. The user interface 120 permits the user to select one or more of a switch, button or icon in connection with various operations of the device 110.

The memory 116 may include one or more memory devices of any of a variety of forms (e.g., read only memory, random access memory, static random access memory, dynamic random access memory, etc.) and can be used by the processor 114 to store and retrieve data. The data that is stored by the memory 116 can include, but need not be limited to, operating systems, applications, and other information. Each operating system includes executable code that controls basic functions of the communication device, such as interaction among the various components, communication with external devices via wireless transceivers and/or component interface, and storage and retrieval of applications and data to and from the memory 116. Each application includes executable code that utilizes an operating system to provide more specific functionality for the communication devices, such as file system service and handling of protected and unprotected data stored in the memory 116.

The network communications interface 122 provides a network connection to other devices, auxiliary components, or accessories for additional or enhanced functionality. For example, the interface 122 may communicate over a local area network with other electronic devices 110 and/or over a wide area network with one or more remote electronic devices 102. Optionally, the network communications interface 122 may include one or more transceivers that utilize a known wireless technology for local wireless communication.

A separate transceiver 128 is illustrated and may be included in the local electronic devices 110. The transceiver 128 is configured to communicate with will other local wireless, electronic devices, such as the headset 110F, camera 110B, smart watch 110B, smart phone 110C, digital personal assistant 110G and the like, to receive AV content from the corresponding electronic device 110 that captures the AV content.

The electronic devices 110 include one or more cameras 112 and microphone 113. The cameras 112 are configured to capture still image and/or video data regarding an environment surrounding the electronic device, including, but not limited to, presentation material and/or gestures that may be made by a user while speaking. The microphone 113 is configured to capture an electronic audio signal from a user of the electronic device 110.

The memory 116 includes, among other things, a signal quality monitoring (SQM) application 126. The functionality of the SQM application 126 is described below in more detail. The network interface 122 establishes an AV communications session, such as between a local (source) user of a local electronic device 110A and a remote (recipient) user of the remote electronic device 102. The transceiver 128 establishes a local wireless link with the wireless headset 110F and/or wireless camera 110E. During the AV communications session between the source and recipient users, the transceiver 128 receives AV content, from a wireless source (e.g., 110F or 110E), for the user. The AV content has a baseline quality for at least a portion of the AV communications session. The SQM application 126 monitors a quality COI associated with the AV content. The SQM application 126 identifies an event-induced signal (EIS) change when the quality of the COI crosses the baseline quality at least one of i) by a predetermined amount or ii) within an event interval. For example, the SQM application 126 identifies EIS degradation when the quality COI drops below the baseline quality at least one of i) by a predetermined amount or ii) within an event interval; and generates, in real-time during the AV communications session, a notification indicating that the quality COI for the AV content has degraded. As another example, the SQM application 126 identifies, as the EIS change, EIS improvement when the quality COI has improved by a sufficient predetermined amount, such as to now exceed the baseline quality for a sustained duration.

The baseline quality may be predefined, updated periodically, or at the request of the user. Additionally, or alternatively, a process may be implemented to establish a baseline quality through user feedback. For example, once a wireless source is paired with an electronic device, the electronic device may prompt the user to enter the initial audio/video content (e.g., standing from the camera or repeated a predetermined statement). The electronic device may then play back the AV content and prompt a user to determine whether the playback of the AV content has acceptable quality (e.g., audio volume, audio quality, video, quality, etc.). When the user indicates that the playback AV content has acceptable quality, the electronic device may record the current settings for one or more quality COI as baseline values (e.g., before the present signal to noise ratio, signal strength, data rate, etc. as baseline values). The baseline quality values and the actual characteristics used as the quality COI may be changed, and/or updated over time to account for changes in environment.

In the foregoing example, the SQM application 126 is implemented on the electronic device 110A that receives the wireless AV content from one or more AV sources. For example, the electronic device 110A may represent the source user's laptop computer, tablet device, DPA device and the like. Additionally, or alternatively, all or portions of the SQB application 126 may be implemented on the wireless source, such as a headset, camera, microphone, smart watch and the like. Additionally, or alternatively, all or a portion of the SQB application 126 may be implemented remotely on a remote resource, such as a remote processing unit 102. The remote processing unit 102 may perform limited operations, such as manage storage and creation of NN audio filters. The remote processing unit 102 communicates with electronic devices 110 through one or more networks 112 to provide access to various information such as updates to NN audio filters, updates to FOIs, feature detectors and the like. The remote processing unit 102 may represent a server or other network-based computing environment. The remote processing unit 102 may represent a single computer system or a collection of computer systems located at a common location or geographically distributed.

The remote electronic device 102 includes one or more processors 104 and memory 106, among other structures that support operation in connection with embodiments herein. The memory 106 may include an SQM application 108 that operates as described herein. The SQM application 108 may operate in connection with AV content originating at the remote electronic device 102 and/or at the local electronic device 110A. It is recognized that the instruction remote processing unit 102 performs other operations, not described herein, such as operations associated with maintaining resources and the like.

Additionally, or alternatively, a memory 150 may be provided, and configured to store a collection of templates 152 for use by one or more SQM applications organized in various manners and related to a wide variety of types of wireless sources, such as different types of wireless microphones, head sets, cameras, and the like. Additionally, or alternatively, based on a local operating environment, such as one type of template for a home office, and any other type of template for open co-working space/cubicles, louder construction areas, The collection of templates 152 may be organized and maintained within any manner of data sources, such as data bases, text files, data structures, libraries, relational files, flat files and the like. Optionally, over time, the templates may be updated based on individual user experiences to improve an extent to which the system is able to provide suggestions for potential events that induced signal degradation. For example, when a user determines that signal degradation may arise by placing certain types of metal objects (e.g., a coffee cup) between a wireless headset and a laptop computer, the information may be collected through the user interface, and transmitted to a remote server that updates the database 150. The cardiac dimensions may be recorded as a new or updated template and conveyed over the network 112 to other electronic devices utilizing the SQM application. For example, the template may designate a type of wireless source, wireless protocol utilized, destination transceiver (at the local electronic device), general environment (office, common workspace, outdoor environment, industrial work area) and the like. The template may further designate the quality COI that was affected (e.g. SNR, signal strength, data rate), as well as an amount or extent of the change in the quality COI (e.g., a change in dB of signal strength, a percentage change in SNR, an event interval of which the change occurred).

Figure 2:
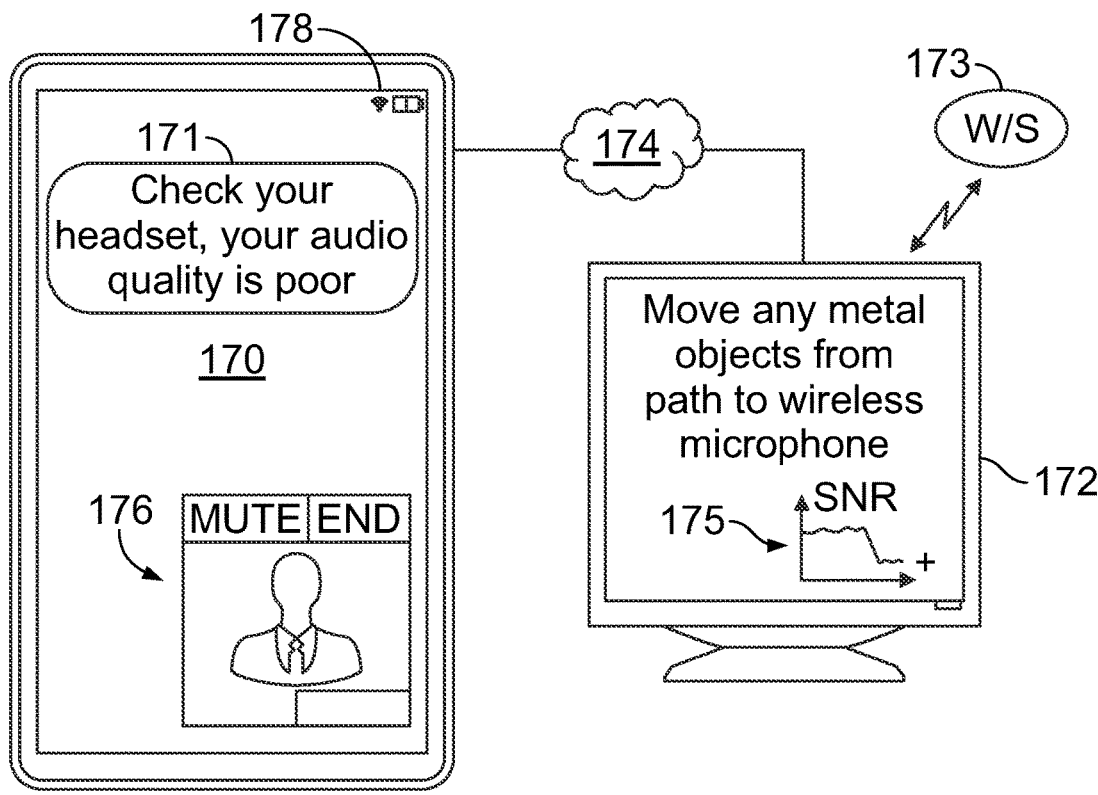
FIG. 2 illustrates an example of a use-case implemented in accordance with embodiments herein.

FIG. 2 illustrates an example of a use-case implemented in accordance with embodiments herein. The example of FIG. 2 illustrates a system implementing a software package to provide audio/video communication between a local user and a remote user. A local electronic device is a smart phone 170, while the remote electronic device is a desktop computer 172. One or both of the smart phone 170 and desktop computer 172 include memory configured to store program instructions and an SQM application, as well as one or more processors configured to execute the program instructions and SQM application. The user of the smart phone 170 may utilize the microphone and camera within a smart phone to collect AV content that is then displayed and presented will desktop computer 172. In reverse, AV content captured at the desktop computer 172 is presented on the smart phone 170 (as denoted at 176. The smart phone 170 may be communicating wirelessly (as denoted by a Wi-Fi indicator and 78) with a local robber, a network access point or otherwise. The smart phone 170, router, and/or network access point may implement in SQ, application to monitor the quality characteristic and identify EIIS degradation. When an EIS degradation is identified, during an AV communication session, the smart phone presents a notification on the display. For example, the notification may represent an audible cue, visual cue and/or a public message that the quality COI has degraded or improved. In the present example, a public message is presented as the notification, at 171, "Check your headset, audio quality is poor." It is recognized that the notification may be less complex, such as simply a color code, alphanumeric rating, or other symbol to inform the local user of EIS degradation within a short period of time.

Additionally, or alternatively, the notification may include an indication of potential sources for the EIS degradation and/or EIS improvement. For example, the desktop computer 172 utilized by a source user and a desktop computer 172 may receive AV content from a wireless source 173. When the desktop computer 172 identifies EIS degradation, a notification may be provided on the display was an indication of potential sources for the EIS degradation. For example, the notification may state, "Move the metal objects from the path to the wireless microphones to." Other examples include "If you just set your phone on your desk, move it further away," and "Whatever you just did may be interfering with the microphone audio." Additionally or alternatively, when the EIS change represents EIS improvement, the notification may state "Whatever you did fixed the problem". Additionally, or alternatively, the notification may include a graph or other multidimensional indicia indicating the quality COI along one axis and time along another axis. For example, the display of the desktop computer 172 illustrates a signal quality metered 175 that is presented as a graph plotting SNR along the vertical axis and time along the horizontal axis over the course of an AV communication session. The signal quality metered 175 is continuously updated to allow the user to see the instantaneous. SNR level associated with the wireless link between the desktop computer 172 and the wireless source 173. In the example of FIG. 2, the SNR level is relatively constant for an initial portion of the AV communication session. At a point during the communication session, the SNR level substantially drops (e.g., 30% or more) in a relatively short period of time (e.g., less than 5 seconds). By monitoring the signal quality meter 173, during a communication session, the source user can immediately identify EIS degradation and be afforded the opportunity to correlate the EIS degradation with an event that occurred at the same time, within the local environment proximate to the wireless source.

Figure 3:
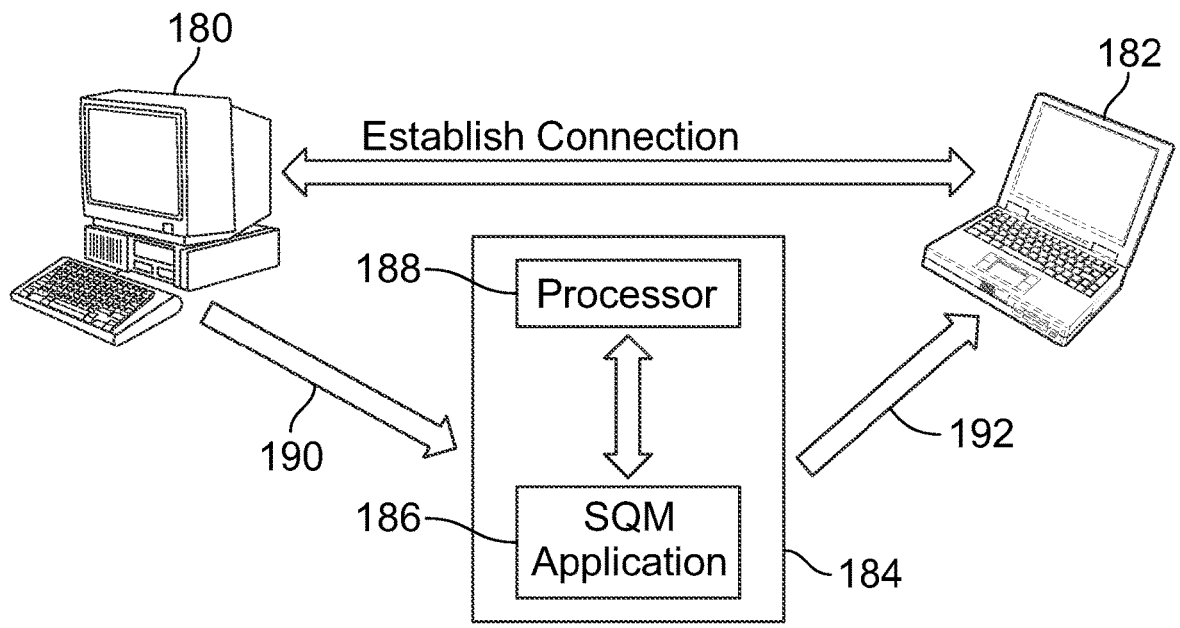
FIG. 3 illustrates an example of a use-case implemented in accordance with embodiments herein.

FIG. 3 illustrates an example of a use-case implemented in accordance with embodiments herein. In the example of FIG. 3, first and second electronic devices 180, 182 establish and maintain a communications session with one another (e.g., audio only or audio/video). The electronic devices 180, 182 include user interfaces, memory and one or more processors that are configured to implement one or more communications platforms that support audio-only and/or audio/video communication (e.g., teleconferencing). The electronic devices 180, 182 do not directly implement the SQM application locally. The SQM application is implemented on a network resource 184. The network resource 184 is provided with memory 186 that stores one or more SQM applications and one or more processors 188. The one or more processors 188, when executing the program instructions, are configured to receive, from a wireless source, AV content for the user, the AV content having a baseline quality for at least a portion of the AV communications session. The one or more processors 188 monitor a quality COI associated with the AV content and identify an event-induced signal (EIS) degradation when the quality COI drops below the baseline quality at least one of i) by a predetermined amount or ii) within an event interval. Additionally or alternatively, the one or more processors 188 monitor a quality COI associated with the AV content and identify an EIS improvement when the quality COI rises above the baseline quality at least one of i) by a predetermined amount or ii) within an event interval. The one or more processors 188 generate, in real-time during the AV communications session, a notification indicating that the quality COI for the AV content has changed (e.g., degraded or improved).

In the present example, the users of the electronic devices 180, 182 may be engages in a business meeting, personal audio-only call, audio/video call, school class, and the like. Optionally, the users of the electronic devices 180, 182 may be working at a call center, police/fire/medical/security emergency hot-line, or other audio-line based service. The one or more processors 188 at the network resource 184 may determine that the wireless source limited to, the electronic device 180 as experienced EIS degradation. In response thereto, the network resource 184 pushes the notification to the electronic device 180, where the notification indicates that the quality COI for the AV content has degraded below an acceptable level. The indication may further designate that the EIS degradation relates to an event occurring in a close proximity to the wireless source (at the electronic device 180) while the user was talking. Additionally or alternatively, the network resource 184 may provide a to the electronic device 180 and intermittently or continuously update an indication that the signal quality meter to present a current quality COI in real time with receipt of the AA content. Additionally, or alternatively, the network resource 184 may push an indication of a potential source for the EIS degradation to the electronic device 180.

Figure 4:
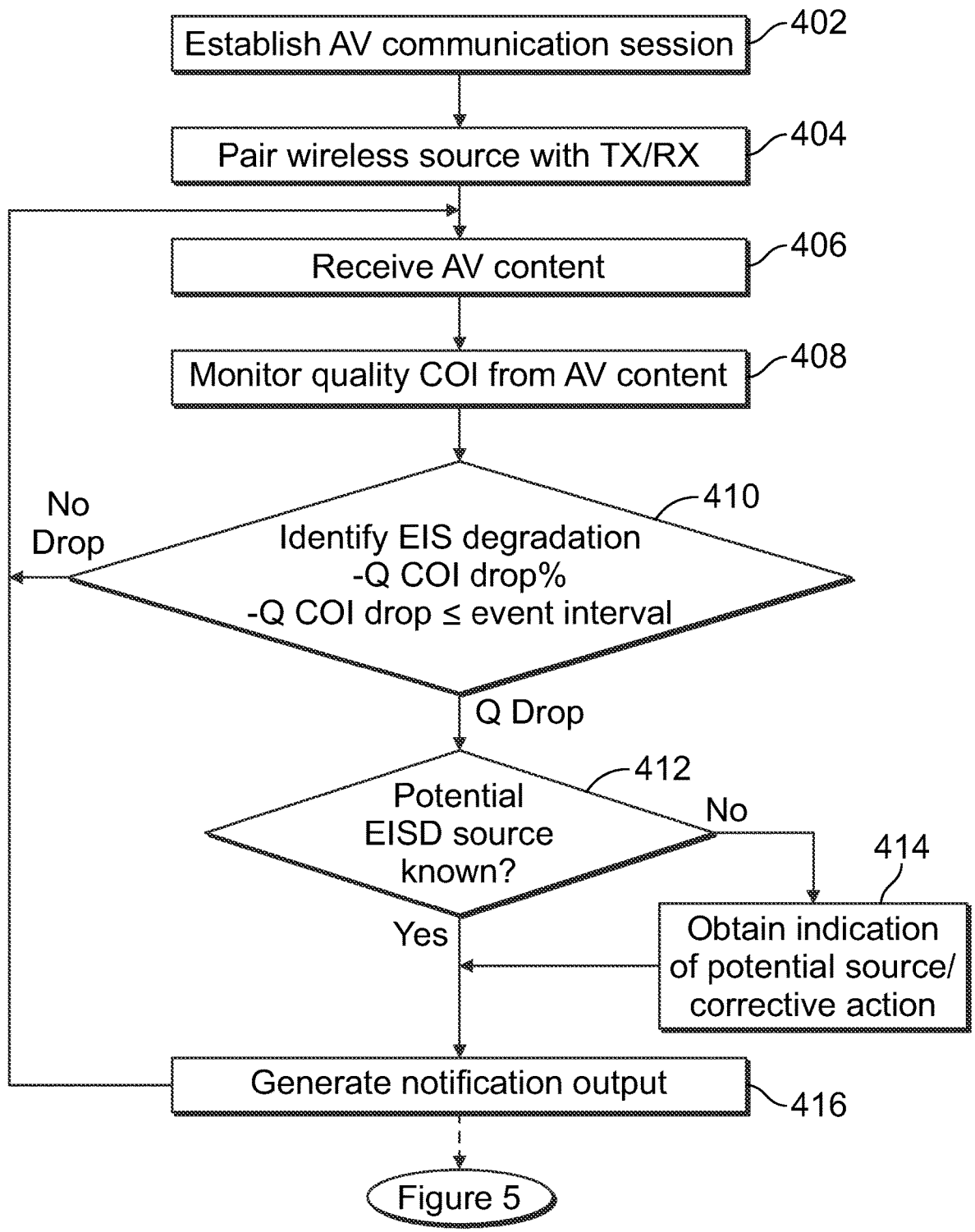
FIG. 4 illustrates a process implemented in accordance with embodiments herein.

FIG. 4 illustrates a process implemented in accordance with embodiments herein. At 402, one or more processors of a local electronic device establish an AV communications session with a remote electronic device. At 404, a transceiver of an electronic device establishes (e.g., pairs) a wireless link with a local wireless source, such as a wireless headset, microphone, camera, smart watch, smart phone, etc.

At 406, during the AV communications session, the transceiver and/or one or more processors of the electronic device receive, from the wireless source, AV content for the user. The AV content has a baseline quality for at least a portion of the AV communications session. The baseline quality may be defined in various manners. For example, baseline quality may be predefined at the time that the SQM application is installed. Additionally, or alternatively, the baseline quality may be automatically initially determined when a wireless device is paired or otherwise associated with an electronic device. For example, when a user installs software for a will new headset were wireless camera, an initial baseline quality may be defined (e.g., baseline signal to noise ratio, baseline signal strength, baseline data rate). The baseline quality may be updated periodically, or at the request of the user. Additionally, or alternatively, the process may be implemented to establish a baseline quality through user feedback. For example, once a wireless source is paired with an electronic device, the electronic device may prompt the user to enter the initial audio/video content (e.g., standing from the camera or repeated a predetermined statement). The electronic device may then play back the AV content and prompt a user to determine whether the playback of the AV content has acceptable quality (e.g., audio volume, audio quality, video, quality, etc.). When the user indicates that the playback AV content has acceptable quality, the electronic device may record the current settings for one or more quality COI as baseline values (e.g., before the present signal to noise ratio, signal strength, data rate, etc. as baseline values). The baseline quality and the actual characteristics used as the quality COI may be changed, and/or updated over time to account for changes in environment.

At 408, the one or more processors of the electronic device monitor a quality COI associated with the AV content. For example, the quality COI may include at least one of signal strength, signal to noise ratio, data rate, dropped data packets, retransmitted data packets, blurred image frames, omitted image frames, blurred audio, or omitted audio.

At 410, the one or more processors of the electronic device identify an event-induced signal (EIS) change when the quality of the COI crosses the baseline quality at least one of i) by a predetermined amount or ii) within an event interval. More specifically, the EIS change represents EIS degradation that is identified when the quality COI drops below the baseline quality at least one of i) by a predetermined amount or ii) within an event interval. For example, the quality COI may be compared to one or more baseline qualities. When the quality COI drops below the baseline quality by a predetermined amount, the one or more processors identify the drop as EIS degradation. Small changes in a quality COI slowly over an extended period of time do not represent "event induced" signal degradation. As explained herein, an event represents some action or change that occurred within a very short period of time (e.g., 0.5 to 5 seconds) that caused an immediate and substantial degradation of the AV content signal quality. For example, the EIS degradation may relate to an event occurring in a proximity to the wireless source while the user is talking and the notification being generated in real-time with the event. As a further example, the wireless source may be a wireless microphone and the AV content may be audio content from the wireless microphone. The EIS degradation relates to an event occurring in a proximity to the microphone while the user is talking and the notification is generated in real-time with the event.

At 410, when no EIS degradation is identified, flow returns to 406. Alternatively, when an EIS degradation is identified, flow moves to 412.

At 412, the one or more processors determine whether a potential EIS degradation source is known. For example, one or more templates may be maintained, identifying potential sources of EIS degradation for particular wireless sources. For example, when a wireless headset exhibits a sudden drop in signal strength, the template may indicate a potential source to be some type of metallic or electromagnetic source place between the wireless headset and an electronic device having a pair transceiver. Additionally or alternatively, when the signal to noise ratio drops significantly in a short period of time, a potential source of interference may be an electromagnetic source, such as a cell phone or other electronic device being positioned proximate to the paired transceiver. Additionally, or alternatively, the template may include corrective actions that may be suggested as well to remove EIS degradation. When a potential EIS source and/or corrective action is known, flow moves to 414. Otherwise, flow continues to 416.

At 414, the one or more processors obtain the indication of the potential source and/or the corrective action.

Next, flow moves to 416, where the notification is generated and output to the user. At 416, the one or more processors of the electronic device generate, in real-time during the AV communications session, a notification indicating that the quality COI for the AV content has degraded. For example, the notification may include at least one of an audible cue, a visual cue, a pop-up message. The notification may be output visually, audibly, as a tactile response and the like. Next, flow returns to 406 where additional AV content is received. Additionally, or alternatively, the notification may include an indication of a potential source for the EIS degradation and/or corrective action. Additionally, or alternatively, the one or more processors may provide, at a UI of the local electronic device, an indication regarding the quality COI. The one or more processors may intermittently or continuously update the indication with a current quality COI in real-time with receipt of the AV content.

Figure 5:
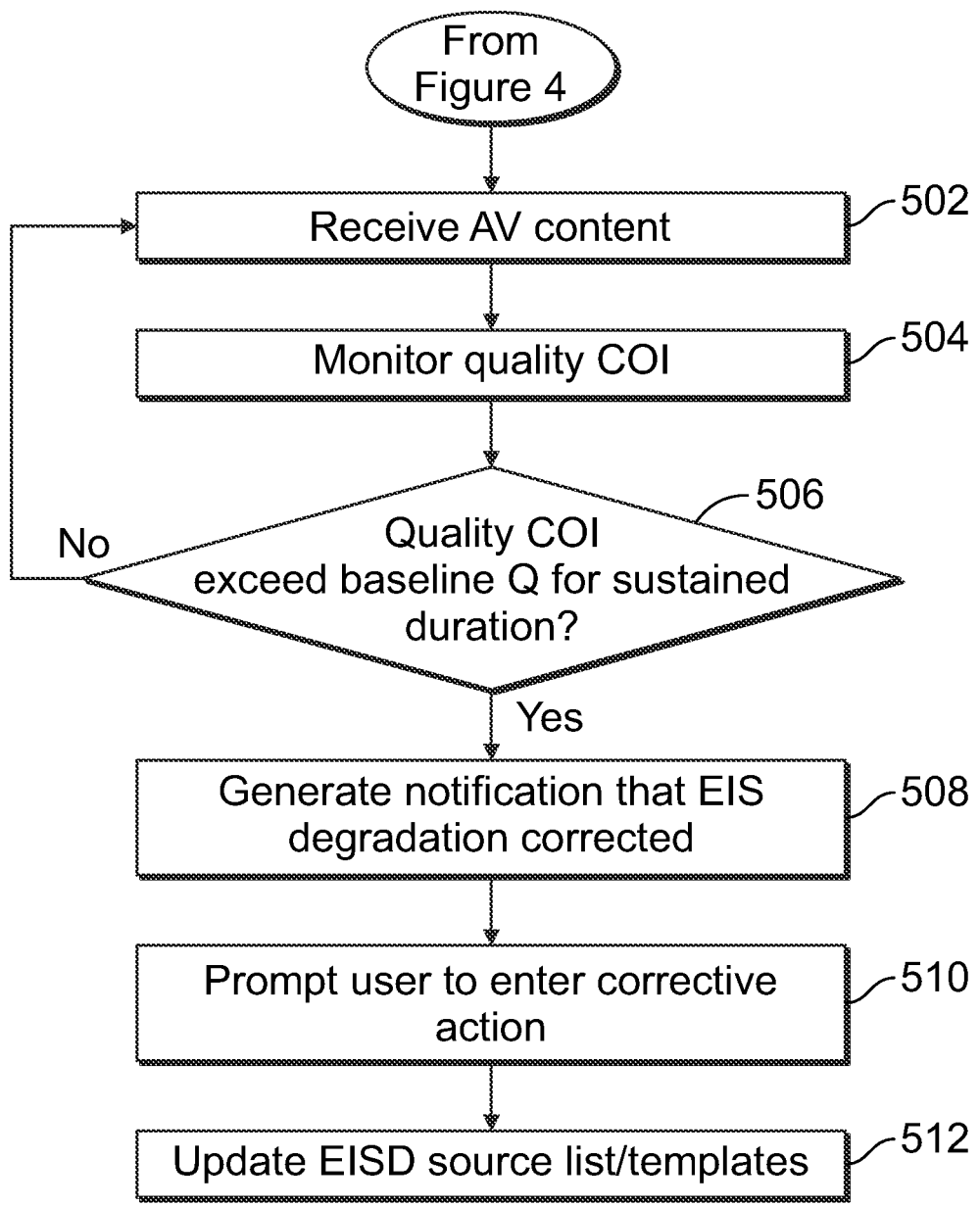
FIG. 5 illustrates a process, to identify when event induced signal degradation has been corrected, in accordance with embodiments herein.

Additionally, or alternatively, once an EIS degradation is identified and a notification generated at 416, flow may move to FIG. 5.

FIG. 5 illustrates a process, to identify when EIS degradation has been corrected, in accordance with embodiments herein. At 502, during the AV communications session, the transceiver and/or one or more processors of the electronic device receive, from the wireless source, AV content for the user. Given that flow moves to FIG. 5 from 416 in FIG. 4, the AV content initially has started below the baseline quality for at least a portion of the AV communications session. At 504, the one or more processors of the electronic device monitor the quality COI associated with the AV content.

At 506, the one or more processors of the electronic device identify an EIS change when the quality of the COI crosses the baseline quality at least one of i) by a predetermined amount or ii) within an event interval. More specifically, the EIS change in FIG. 5 represents EIS improvement that is identified when the quality COI has improved by a sufficient predetermined amount, such as to now exceed the baseline quality for a sustained duration. For example, the decision at 506 may require the SNR to exceed the baseline (or a corrective baseline) for X seconds to indicate the problem event has been corrected. Optionally, a corrective baseline may be different that the initial baseline quality. For example, if the initial SNR was 60%, a corrective baseline may be 50%. Optionally, more than one quality COI may be compared to corresponding corrective baseline values. When the quality COI does not exceed the baseline quality by a predetermined amount (and optionally for a desired period of time), the one or more processors identify the EIS degradation to remain and flow returns to 502. When the quality COI exceeds the baseline quality by a predetermined amount (and optionally for a desired period of time), the one or more processors identify the EIS degradation to be corrected, and flow continues to 508.

At 508, the one or more processors of the electronic device generate, in real-time during the AV communications session, a notification indicating that the EIS degradation has been corrected and/or the quality COI for the AV content has returned to an acceptable level. For example, the notification may include at least one of an audible cue, a visual cue, a pop-up message. The notification may be output visually, audibly, as a tactile response and the like.

At 510, optionally, the one or more processors may prompt the user to enter information regarding the corrective action. For example, the user may enter a short explanation for what action was taken to improve the quality. At 512, the corrective action may be saved as an update to a list or template for an EIS degradation sources. The corrective action may be conveyed over one or more networks to other electronic devices and/or network resources to be used with other individuals. For example, a database may be built where the database stores corrective actions to be suggested when certain changes in quality COI are identified for corresponding types of wireless sources.

Closing Statements

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general-purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming.

The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B. For the avoidance of doubt, the claim limitation "associated with one or more of the client device and a user of the client device" means and shall encompass i) "associated with the client device", ii) "associated with a user of the client device" and/or iii) "associated with both the client device and a user of the client device". For the avoidance of doubt, the claim limitation "one or more of touch, proximity sensing, gesture or computer vision" means and shall encompass i) "touch", ii) "proximity", (iii) "sensing", (iv) "gesture", and/or (iv) "computer vision" and any sub-combination thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method for monitoring audio and video content, the method comprising:
    under control of one or more processors configured with specific executable program instructions, during an audio and video communications session between a user and a recipient:
    receiving, from a wireless source, audio and video content for the user, the audio and video content having a baseline quality for at least a portion of the audio and video communications session;
    monitoring a quality characteristic of interest (COI) of an audio and video content signal associated with the audio and video content;
    identifying interference in the audio and video content signal when the quality COI of the audio and video content signal crosses the baseline quality at least one of i) by a predetermined amount or ii) within an event interval; and
    generating, in real-time during the audio and video communications session, a notification indicating that the quality COI of the audio and video content signal for the audio and video content has changed;
maintaining a template related to the interference on the audio and video content signal that includes a corrective action to remove the change;
    updating the template over time based on a local environment or user experience; and
generating, in real-time during the audio and video communications session, a notification indicating the corrective action to remove the interference.

2. The method of claim 1, further comprising:
    providing, at a user interface, an indication regarding the quality COI of the audio and video content signal; and
    intermittently or continuously updating the indication with a current quality COI of the audio and video content signal in real-time with receipt of the audio and video content.

3. The method of claim 1, wherein the interference represents degradation that relates to an event occurring in a proximity to the wireless source while the user is talking and the notification being generated in real-time with the event.

4. The method of claim 3, wherein the wireless source is a wireless microphone, the audio and video content includes audio content from the wireless microphone, the interference representing degradation related to an event occurring in a proximity to the microphone while the user is talking and the notification being generated in real-time with the event.

5. The method of claim 1, wherein the quality COI of the audio and video content signal includes at least one of signal strength, signal to noise ratio, data rate, dropped data packets, or retransmitted data packets.

6. The method of claim 1, wherein the notification includes at least one of an audible cue, a visual cue, a pop-up message, the notification indicating that the quality COI for the audio and video content has degraded or improved.

7. The method of claim 1, wherein the interference represents degradation that is identified when the quality COI of the audio and video content signal drops below the baseline quality, the method further comprising, in response to the identification of the degradation, continuing to monitor the quality COI of the audio and video content signal associated with the audio and video content, and identifying an improvement when the quality COI of the audio and video content signal has increased to exceed the baseline quality or a corrective baseline.

8. The method of claim 1, further comprising: prompting the user to enter information regarding the corrective action.

9. A device, comprising:
one or more processors; and
memory storing program instructions accessible by the one or more processors, wherein, responsive to execution of the program instructions, during an audio and video communications session between a user and a recipient, the one or more processors:
receive, from a wireless source, audio and video content for the user, the audio and video content having a baseline quality for at least a portion of the audio and video communications session;
monitor a quality characteristic of interest (COI) of an audio and video content signal associated with the audio and video content;
identify interference in the audio and video content signal when the quality COI of the audio and video content signal crosses the baseline quality at least one of i) by a predetermined amount or ii) within an event interval; and
generate, in real-time during the audio and video communications session, a notification indicating that the quality COI of the audio and video content signal for the audio and video content has changed;
maintain a template related to the interference on the audio and video content signal that includes a corrective action to remove the change;
update the template over time based on a local environment or user experience; and
generate, in real-time during the audio and video communications session, a notification indicating the corrective action to remove the interference.

10. The device of claim 9, further comprising a user interface configured to provide an indication regarding the quality COI of the audio and video content signal; and intermittently or continuously update the indication with a current quality COI of the audio and video content signal in real-time with receipt of the audio and video content.

11. The device of claim 9, wherein the interference represents degradation related to an event occurring in a proximity to the wireless source while the user is talking and the notification being generated in real-time with the event.

12. The device of claim 11, wherein the wireless source is a wireless microphone, the audio and video content is audio content from the wireless microphone, the interference represents degradation related to an event occurring in a proximity to the microphone while the user is talking and the notification being generated in real-time with the event.

13. The device of claim 9, wherein the quality COI of the signal includes at least one of signal strength, signal to noise ratio, data rate, dropped data packets, or retransmitted data packets.

14. The device of claim 9, wherein the notification includes an indication of at least one of a potential source for degradation or a suggested corrective action to take to potentially correct the degradation.

15. The device of claim 9, wherein the interference represents degradation that is identified when the quality COI of the audio and video content signal drops below the baseline quality, and wherein, responsive to execution of the program instructions, the one or more processors are further configured to, in response to the identification of the degradation, continue monitoring the quality COI of the audio and video content signal associated with the audio and video content, and identify an improvement when the quality COI of the audio and video content signal has increased to exceed the baseline quality or a corrective baseline.

16. The device of claim 9, wherein the device represents one of a headset, microphone, camera, smart phone, desktop computer, laptop computers, tablet device, smart TV, or digital personal assistant (DPA) device, the device comprising at least one of software or firmware to perform the monitoring, identifying and generating operations.

17. A computer program product comprising a non-signal computer readable storage medium comprising computer executable code to:
during an audio and video communications session between a user and a recipient,
receive, from a wireless source, audio and video content for the user, the audio and video content having a baseline quality for at least a portion of the audio and video communications session;
monitor a quality characteristic of interest (COI) of an audio and video content signal associated with the audio and video content;
identify interference in the audio and video content signal when the quality COI of the signal crosses the baseline quality at least one of i) by a predetermined amount or ii) within an event interval; and
generate, in real-time during the audio and video communications session, a notification indicating that the quality COI of the audio and video content signal for the audio and video content has changed;
maintain a template related to the interference on the audio and video content signal that includes a corrective action to remove the change;
update the template over time based on a local environment or user experience; and
generate, in real-time during the audio and video communications session, a notification indicating the corrective action to remove the interference.

18. The computer program product of claim 17, wherein the interference represents degradation, the computer program product further comprising computer executable code to, in response to the identification of the degradation, continue to monitor the quality COI of the audio and video content signal associated with the audio and video content, and determine when the quality COI has increase to exceed the baseline quality or a corrective baseline.

19. The computer program product of claim 17, further comprising computer executable code to define the quality COI of the audio and video content signal as at least one of signal strength, signal to noise ratio, data rate, dropped data packets, or retransmitted data packets.

* * * * *